UNITED STATES PATENT OFFICE.

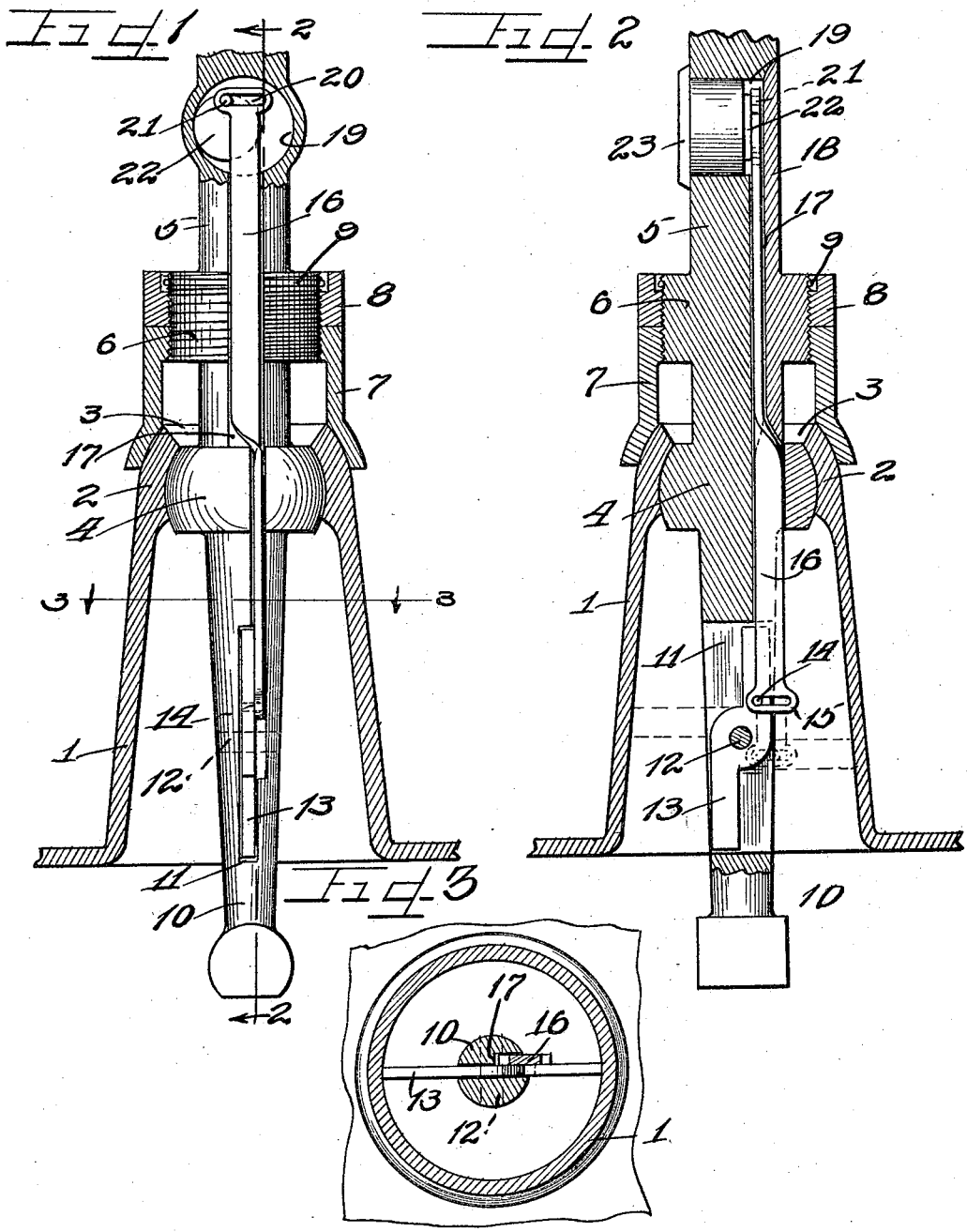

COLVIN L. JOHNSON, OF CHICAGO, ILLINOIS, ASSIGNOR TO JOHNSON AUTOMOBILE LOCK CO., OF CHICAGO, ILLINOIS, A CORPORATION OF ILLINOIS.

AUTOMOBILE LOCK.

1,414,023.	Specification of Letters Patent.	Patented Apr. 25, 1922.

Application filed January 27, 1919. Serial No. 273,379.

*To all whom it may concern:*

Be it known that I, COLVIN L. JOHNSON, a citizen of the United States, and a resident of the city of Chicago, in the county of Cook and State of Illinois, have invented certain new and useful Improvements in an Automobile Lock; and I do hereby declare that the following is a full, clear, and exact description of the same, reference being had to the accompanying drawings, and to the numerals of reference marked thereon, which form a part of this specification.

This invention more particularly relates to an improved type of an automobile lock wherein the gear shift lever is adapted to be locked against movement by means of a pivoted member normally disposed longitudinally within a slot in the lower portion of the lever, and adapted to be swung outwardly at right angles to the lever into locking position to engage the inner walls of the lever supporting housing to prevent shifting of the lever.

It is an object of this invention to provide an automobile lock wherein the gear shift lever is locked against operation by a pivoted member adapted to engage the fulcrum housing of said lever.

Another object of the invention is the construction of a gear shift lever lock having a balanced locking member adapted to be positioned to project diametrically through the gear shift lever when in locking position to hold the lever locked against shifting.

A further object of the invention is the construction of a gear shift lever lock adapted to hold the gear shift lever locked against a shifting movement by means of a balance-beam adapted to be moved into locking position by a key actuated latching bar.

It is an important object of this invention to provide a fulcrumed lever lock of simple and effective construction wherein a beam pivoted within a slot in the lever is adapted to be swung into a position wherein the ends of the beam are adapted to engage the fulcrum housing of said lever to hold the lever locked against movement.

Other and further important objects of this invention will be apparent from the disclosures in the specification and drawings.

The invention (in a preferred form) is illustrated in the drawings and hereinafter more fully described.

On the drawings:

Figure 1 is an elevational view of the lower end of a gear shift lever equipped with a locking mechanism embracing the principles of this invention, said view showing the lever housing and a portion of the lever in section to disclose the locking mechanism.

Figure 2 is a section taken on line 2—2, of Figure 1, showing the operation of the locking mechanism in dotted lines.

Figure 3 is a section taken on line 3—3, of Figure 1, showing the balance-beam in locking position.

As shown on the drawings:

The reference numeral 1 indicates a fulcrum housing or socket casing mounted upon the top of a transmission gear shift case (not shown). Formed integrally on the upper end of the housing 1, is a dome shaped or rounded socket 2, provided with a central aperture or opening 3, which communicates with a ball shaped chamber within said socket, for movably receiving seated therein the ball portion 4, of a gear shift lever 5, which projects upwardly through said opening 3. Integrally formed on the lever 5, a short distance above the ball portion 4, is an externally threaded enlarged circular collar or flange 6.

For the purpose of holding the ball portion 4, seated within the socket 2, a bell shaped ring 7, is threaded upon the flange 6, to permit the lower or bell shaped portion of the ring 7, to movably fit over the upper rounded part of the socket 2, to permit universal movement of the ring 7, over the socket, when the lever 5, is actuated. To lock the ring 7, in position, a collar 8, and a washer 9, are threaded upon the upper end of the flange 6, with the collar 8, seated upon the upper portion of the ring 7.

The lower end of the lever 5, below the ball portion 4, affords a tail piece 10, which is provided with a longitudinal slot 11, disposed diametrically in said tail piece and open at both sides. Projecting diametrically through the tail piece 10, and at right angles to the slot 11, is a pin 12, on which is pivotally mounted a balanced locking member or locking balance-beam 13, the arms of which are offset and extend in opposite directions from the pivot pin 12. The length of the slot 11, is long enough to permit the locking-beam in normal position to be swung upwardly to lie longitudinally within the lever tail piece 10, as shown in Figure 2. Secured rigidly to one side of one of the balance-beam arms is a peg or pin 14. The pin 14, projects through a transverse slot 15, formed in the lower end of a long upwardly extending locking or latch bar 16, twisted near its middle portion to permit the same to fit within a long passage 17, formed longitudinally within the lever 5. As clearly shown in Figure 2, the passage 17, which opens through one side of the lever 5, has the upper part thereof closed by means of a suitably shaped retaining plate or bar 18, which is disposed in the outer part of the passage 17, and is secured to the lever 5, by any suitable means to enclose the upper portion of the latch bar 16. The lower slotted end of the latch bar 16, projects into the slot 11, to engage the locking-beam pin 14.

Formed in the upper portion of the gear shift lever 5, is a chamber 19, communicating with the upper end of the passage 17, and into which the upper end of the latch bar 16, projects. A transverse slot 20, is provided in the upper end of the latch bar 16, to receive a pin 21 formed on a round projection 22, on the barrel 23, of a pin lock mounted within the chamber 19.

The operation is as follows:

When positioned vertically as shown in Figure 1, the gear shift lever 5, is in neutral position. To shift the gears a composite movement of the gear shift lever is necessary, that is, the lever must be thrown to one side and then either forwardly or rearwardly. Normally the locking mechanism for the gear shift lever is positioned as disclosed in full lines in Figure 2. To lock the gear shift lever 5, against movement the lever is first moved to neutral position, and a key is inserted in the barrel 23, of the pin lock. Rotation of the barrel 23, causes the lock pin 21, to slide in the upper latch bar slot 20, thereby forcing the latch bar 16, downwardly against the pin 14, which slides in the lower latch bar slot 15, and forces the locking-beam 13, to rotate on the pivot pin 12, into locking position as shown in dotted lines in Figure 2, and in full lines in Figure 3. In the locking position of the locking-beam 13, the ends of the offset locking-beam arms engage against the inner surface of the housing 1, thereby holding the gear shift lever locked, and preventing interference with the gear shift mechanisms controlled by the gear shift lever.

For the purpose of unlocking the gear shift lever the key for the pin lock is inserted in the key hole of the lock and turned to rotate the barrel 23, in a direction opposite, to elevate the latch bar 16, to swing the locking-beam 13, out of engagement with the housing walls, and back into normal position longitudinally within the gear shift lever slot 11.

I am aware that numerous details of construction may be varied through a wide range without departing from the principles of this invention, and I therefore do not purpose limiting the patent granted otherwise than necessitated by the prior art.

I claim as my invention:

1. The combination with a gear shift lever and the housing thereof, of means carried in said lever adapted to be moved from an upright to a horizontal position to engage said housing for holding said lever locked against movement.

2. The combination with a gear shift lever and the housing thereof, of means pivoted within said lever adapted to be swung into locking position at right angles to said lever to engage said housing walls to hold the lever locked against movement.

3. In an automobile lock of the class described the combination with a slotted gear shift lever and the support therefor, of a locking member pivotally engaged in said slotted lever, and means for actuating said locking member to swing the same at right angles to said lever to engage said support to hold the lever locked against movement.

4. In a gear shift lever lock the combination with a gear shift lever having a slot therein, of a support for the lever a balance locking member pivoted within said slot, and a latch bar slidable in said lever adapted to swing said member to project diametrically through said lever to engage said support to hold the lever locked against movement.

5. In a lock of the class described the combination with a gear shift lever having a slot in the lower portion thereof, of a support for the lever enclosing the lower end thereof, a locking member pivoted in said slot and normally disposed longitudinally with respect to said lever, said lever having a longitudinal passage communicating with said slot, and a latching member slidably engaged in said passage and connected with said locking member for swinging the same into locking position at right angles to said lever to engage said support to hold the lever locked against movement.

6. In a lock the combination with a gear shift lever having a longitudinal slot and passage therein communicating with one another, a housing for said lever a locking member pivoted in said slot and adapted normally to lie longitudinally in said slot, a latch bar in said lever passage connected with said locking member, and means for operating said latch bar to cause said locking member to swing into a locking position at right angles to said lever to engage said housing to hold the lever locked against movement.

7. In a lock the combination with a gear shift lever and the housing thereof, said lever having a diametric slot therein and a longitudinal passage communicating with said slot, key-operated means within said lever, and a locking member pivoted in said slot adapted to be actuated by said key-operated means to swing into a position to engage said housing to hold the lever locked in position.

8. In a lock the combination with a gear shift lever having a slot and passage communicating with one another, a housing for supporting said lever, a bar slidably disposed in said passage and projecting into said slot, key-operated means in said lever connected with said bar, and a locking member pivoted in said slot and connected with said bar, said key-operated means adapted to be operated to slide said bar to cause the locking member to project transversely through said lever and engage said housing to hold the lever locked against movement.

9. The combination with a gear shift lever and the housing thereof, said lever having a passage and a diametric slot therein, a locking member pivoted in said slot and normally disposed longitudinally with respect to the lever, a pin on said locking member, a slotted latch bar slidably disposed in the lever passage and engaging said pin, a key-operated lock in said lever, and a pin thereon engaging through said latch bar, said key-operated means adapted to be operated to slide said bar and cause the same to rotate the locking member into a position at right angles with respect to said lever to engage the housing for holding the lever locked against movement.

10. The combination with a gear shift lever having a diametric slot therein, of a two arm locking member normally disposed longitudinally in said slot, a casing for supporting said lever, and means connected with one of the locking member arms for swinging the locking member into a position to project diametrically through the lever to engage the casing walls to hold the lever locked against movement.

11. The combination with a gear shift lever and the housing thereof, of means carried by the lever below the point of pivotal connection thereof, adapted to be positioned transversely of the lever to engage said housing for holding the lever locked against movement.

12. The combination with a gear shift lever and the supporting housing thereof, of a one piece means on said lever within the housing adapted to be moved to engage opposite walls of the housing to hold the lever locked in neutral position.

13. A device of the character described comprising in combination with a gear shift lever and its support, means carried by said lever and pivotally secured thereto for engagement with said support, and means movable longitudinally of the lever for operating said support engaging means.

14. A device of the character described comprising in combination with a gear shift lever and its housing, a plurality of members pivotally carried by said lever, and means movable longitudinally of said lever for causing engagement of the free ends of said pivoted members with said housing to prevent lateral movement of the said lever.

15. A device of the character described comprising in combination with a transmission housing, a gear shift lever pivotally mounted in said housing and having a cut-out portion in its lower end, a pair of radially swinging levers pivotally secured in said cut-out portion and adapted for movement into engagement with said housing, and means movable longitudinally of said lever for operating said swinging levers.

16. A device of the character described comprising a combination with a transmission housing, a gear shift lever pivotally mounted in said housing and having a cut-out portion in the lower end, a plurality of swinging arms pivotally carried by the lower end of said lever and adapted for movement into engagement with the inner face of said transmission housing, a shaft movable longitudinally of the gear shift lever for operating said swinging members, and means carried by the free end of said gear shift lever for operating said shaft.

17. A device of the character described comprising in combination with a gear shift lever and its housing, a plurality of members pivotally carried by said lever, and means for causing engagement of the free ends of said pivoted members with said housing to prevent lateral movement of the lever.

18. A device of the character described comprising in combination with a suitable support, an operating lever pivoted intermediate of its ends to said support, means carried by said lever intermediate of one of its ends and its pivotal point for engagement with the support to prevent movement of said lever, and means for moving said support-engaging means into and out of operative position.

19. A device of the character described comprising in combination with a gear shift lever and its support, means carried by said lever between one of its ends and its pivotal point for engagement with said support to prevent movement of the lever, and means for moving said support-engaging means into and out of engagement with said support.

In testimony whereof I have hereunto subscribed my name in the presence of two subscribing witnesses.

COLVIN L. JOHNSON.

Witnesses:
CHARLES W. HILLS, Jr.,
E. McMULLEN.